United States Patent
Sanjurjo et al.

(10) Patent No.: US 7,959,707 B2
(45) Date of Patent: Jun. 14, 2011

(54) METHODS FOR PRODUCING CONSOLIDATED MATERIALS

(75) Inventors: Angel Sanjurjo, San Jose, CA (US);
Kai-Hung Lau, Cupertino, CA (US);
Xiaobing Xie, Foster City, CA (US);
Anoop Nagar, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 394 days.

(21) Appl. No.: 11/799,387

(22) Filed: Apr. 30, 2007

(65) Prior Publication Data
US 2007/0266826 A1    Nov. 22, 2007

Related U.S. Application Data

(60) Provisional application No. 60/745,873, filed on Apr. 28, 2006.

(51) Int. Cl.
*B22F 9/20* (2006.01)

(52) U.S. Cl. ............... 75/369; 75/620; 423/349

(58) Field of Classification Search ............. None
See application file for complete search history.

(56) References Cited

U.S. PATENT DOCUMENTS

| | | |
|---|---|---|
| 2,874,040 A | 2/1959 | Ferraro, Jr. |
| 3,152,090 A | 10/1964 | Cobel et al. |
| 4,356,141 A | 10/1982 | Sanjurjo et al. |
| 4,388,286 A | 6/1983 | Kapur et al. |
| 4,561,883 A | 12/1985 | Müllner et al. |
| 4,683,147 A | 7/1987 | Eguchi et al. |
| 4,816,420 A | 3/1989 | Bozler et al. |
| 4,828,814 A | 5/1989 | Sanjurjo et al. |
| 5,057,163 A | 10/1991 | Barnett et al. |
| 5,213,628 A | 5/1993 | Noguchi et al. |
| 5,266,125 A | 11/1993 | Rand et al. |
| 5,316,592 A | 5/1994 | Dinwoodie |
| 5,356,509 A | 10/1994 | Terranova et al. |
| 5,397,737 A | 3/1995 | Mahan et al. |
| 5,482,570 A | 1/1996 | Saurer et al. |
| 5,496,416 A | 3/1996 | Hall et al. |

(Continued)

FOREIGN PATENT DOCUMENTS

EP    0304715 A    3/1989

(Continued)

OTHER PUBLICATIONS

ASM Handbook, vol. 2 Properties and Selection, pp. 1093-1094, published by ASM International, 1990.*

(Continued)

*Primary Examiner* — George Wyszomierski

(57) ABSTRACT

Aspects of the invention include methods for producing purified semiconductor or metallic materials. In one embodiment, the methods include admixing a particulate composition of a material, for instance, a metal, with a metal halide to produce a metal-metal halide admixture. The admixture is then heated to a temperature that is above the material's melting point in a container that is chemically and physically stable at that temperature. The molten admixture is allowed to segregate into a lower of the material and an layer of the metal halide and cooled. The metal halide is then separated from the material and a purified semiconductor or metallic material is thereby produced. Also provided are purified material crystals, shaped ingots and/or taper, sheet, or ribbons produced by such methods, as well as the silicon chips and solar panels in which such products are employed.

20 Claims, 5 Drawing Sheets

U.S. PATENT DOCUMENTS

| | | |
|---|---|---|
| 5,510,272 A | 4/1996 | Morikawa et al. |
| 5,593,901 A | 1/1997 | Oswald et al. |
| 5,627,081 A | 5/1997 | Tsuo et al. |
| 5,702,538 A | 12/1997 | Endrös et al. |
| 5,744,305 A | 4/1998 | Fodor et al. |
| 5,855,678 A | 1/1999 | Sanjurjo et al. |
| 5,863,598 A | 1/1999 | Venkatesan et al. |
| 5,874,214 A | 2/1999 | Nova et al. |
| 5,935,293 A | 8/1999 | Detering et al. |
| 5,998,730 A | 12/1999 | Shiozaki et al. |
| 6,211,455 B1 | 4/2001 | Ford et al. |
| 6,362,414 B1 | 3/2002 | Fujisawa et al. |
| 6,416,721 B1 | 7/2002 | Sanjurjo et al. |
| 6,444,898 B1 | 9/2002 | Fujisawa et al. |
| 6,452,090 B2 | 9/2002 | Takato et al. |
| 6,468,885 B1 | 10/2002 | Mahan et al. |
| 6,472,296 B2 | 10/2002 | Fujioka et al. |
| 6,488,995 B1 | 12/2002 | Nishimoto et al. |
| 6,500,500 B1 | 12/2002 | Okamura |
| 6,538,195 B1 | 3/2003 | Shi et al. |
| 6,541,693 B2 | 4/2003 | Takada et al. |

FOREIGN PATENT DOCUMENTS

| | | |
|---|---|---|
| JP | 05-315258 A * | 11/1993 |
| JP | 05-330815 A | 12/1993 |
| JP | 2003-012317 A | 1/2003 |

OTHER PUBLICATIONS

PCT Search Report and Written Opinion for PCT/US2007/010503, Nov. 26, 2007, copy consists of 14 unnumbered pages.

Database WPI Week 197502, Derwent Publications Ltd., London, GB; AN 1975-03391W, XP00248414 & SU 418 529 A (Kanaev Yu P), Jul. 24, 1974..

Database WPI Week 200063, Derwent Publications Ltd., London, GB; AN 2000-647763, XP002458415 & CN 1 143 605 A (Li Z), Feb. 26, 1997.

Database WPI Week 197747, Derwent Publications Ltd., London, GB; AN 1977-84287Y, XP002458416 & SU 539 979 A (Kanaev Yu P.), Mar. 30, 1977.

* cited by examiner ary of the invention is not an extensive overview of the invention.

METHODS FOR PRODUCING CONSOLIDATED MATERIALS

BACKGROUND OF THE INVENTION

There continues to be an increasing demand for the production of highly pure materials such as silicon, titanium, iron, nickel, boron, gallium, etc. For instance, there is a soaring demand for high grade, pure silicon for use in the semiconductor and solar cell industries. Additionally, specialty alloys, such as those of titanium, $TiV_4Al_6$ and similar alloys, which are strong and lightweight, are widely used throughout the aerospace and defense industries. Manufacturing methods currently employed for the production of high purity materials, such as silicon and titanium, are energy intensive, costly, and generate a significant amount of excess product (e.g., Si or Ti fines) that is either commercially unusable or it requires significant reprocessing.

For example, in many instances, the production of both silicon and titanium results in the generation of a large quantity of fine silicon or titanium powder that is typically unusable in the further production of the high grade material. For instance, the trichlorosilane method of silicon production, wherein metallurgical grade silicon is contacted with HCl to produce trichlorosilane and then the trichlorosilane is converted back to pure silicon by reduction with hydrogen, using filament type reactors, requires over 100 Kwh/kg of silicon. In an effort to decrease the energy consumption, new fluidized bed reactors are being used, but they produce approximately 20% unusable fines that are difficult to consolidate and, therefore, results not only in the production of a highly pure electronic grade pellet, but also in the generation of 10 to 20% of a fine silicon powder having an average particle diameter in the sub-microns. In the Ti industry, the Kroll process is being substituted by other processes such as the Armstrong process for the production of high grade titanium which also results in the generation of a large quantity of excess titanium powder also having an average particle diameter in the sub-microns. Equally, the electrochemical deoxidation of $TiO_2$ results in the generation of very fine particles of Ti.

The use of such fine grain silicon and titanium powders in the further production of high grade materials is difficult because the fine particulate matter has a high surface to volume area making them good thermal insulators. Hence, it is hard to consolidate these materials because the heat applied in the consolidation process is not readily transferred to the core of the particles but is rather dispersed throughout the surface of the bulk material. Another complication with respect to the purification and consolidation of reactive materials (such as metals) is that fine powders of such metals are highly reactive with the oxygen in air, resulting in the generation of a thick oxide coating on the surface of the metal particles, which oxide coating further prevents the metal particles from consolidating.

Accordingly, there is a need for a process that makes use of such fine powders in the production of high grade, pure consolidated materials that can be further processed into useful forms by conventional processes such as extruding, forging, milling, machining. The present invention meets those and other such needs.

SUMMARY OF THE INVENTION

Aspects of the invention include methods for producing purified semiconductor or metallic materials. In one embodiment, the methods include admixing a particulate composition of a material, for instance, a metal, with a halide to produce a material-halide admixture. The admixture is then heated to a temperature that is above the material's melting point in a container that is chemically and physically stable at that temperature. The molten admixture is allowed to segregate into a layer of the material and a layer of the halide and cooled. The halide layer is then separated from the material layer and a purified semiconductor or metallic material is thereby produced. Also provided are purified material crystals, shaped ingots and/or taper, sheet, or ribbons produced by such methods, as well as the silicon chips and solar panels in which such products are employed.

BRIEF DESCRIPTION OF THE DRAWINGS

According to common practice, the various features of the drawings may not be drawn to-scale. Rather, the dimensions of the various features may be arbitrarily expanded or reduced for clarity. Included in the drawings are the following figures.

Figure 1:
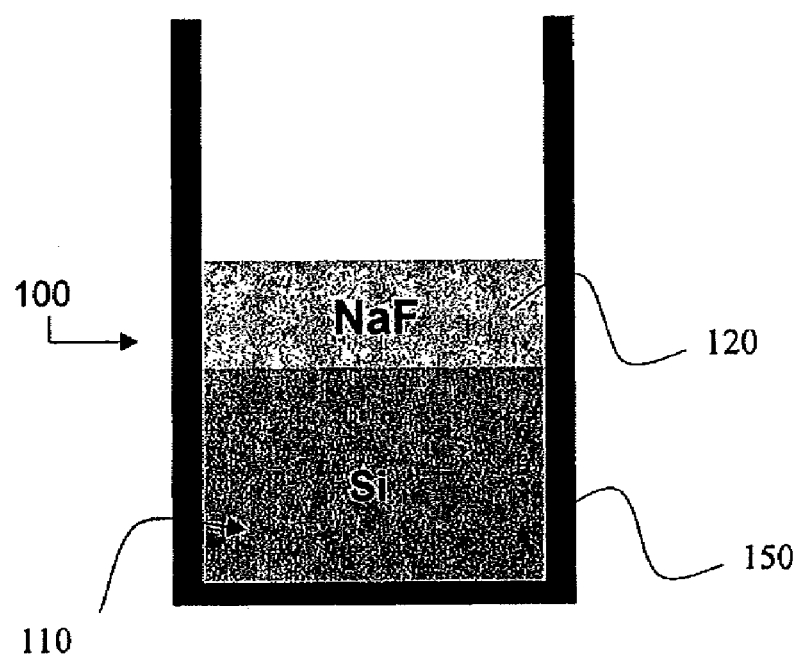
FIG. 1 illustrates a flow diagram of an embodiment in accordance with the invention.

Before the present invention is further described, it is to be understood that this invention is not limited to particular embodiments described, as such may of course vary. It is also to be understood that the terminology used herein is for the purpose of describing particular embodiments only, and is not intended to be limiting. Unless defined otherwise, all technical and scientific terms used herein have the same meaning as commonly understood by one skilled in the art to which this invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Throughout this application, various publications, patents and published patent applications are cited. The disclosures of these publications, patents and published patent applications referenced in this application are hereby incorporated by reference in their entirety into the present disclosure. Citation herein by the Applicant of a publication, patent, or published patent application is not an admission by the Applicant of said publication, patent, or published patent application as prior art.

It must be noted that as used herein and in the appended claims, the singular forms "a", "and", and "the" include plural referents unless the context clearly dictates otherwise. Thus, for example, reference to a "semiconductor or metallic material" includes a plurality of such materials, and reference to "the halide" includes reference to one or more halides and equivalents thereof known to those skilled in the art, and so forth. It is further noted that the claims may be drafted to exclude any optional element. As such, this statement is intended to serve as antecedent basis for use of such exclusive terminology as "solely", "only" and the like, in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

DETAILED DESCRIPTION

Aspects of the subject invention include methods for producing purified semiconductor or metallic materials. In one embodiment, the methods include admixing a particulate composition of a material, for instance, a metal, with a metal halide to produce a metal-metal halide admixture. The admixture is then heated to a temperature that is above the material's melting point in a container that is chemically and physically stable at that temperature. The molten admixture is allowed to segregate into a layer of the material and an layer of the metal halide and cooled. The metal halide is then separated from the material and a purified semiconductor or metallic material is thereby produced. Also provided are purified material crystals, shaped ingots and/or taper, sheet, or ribbons produced by such methods, as well as the silicon chips and solar panels in which such products are employed.

The subject methods for producing a consolidated material of the invention will be described first, followed by a description of the products produced by such methods. A discussion of representative uses of the subject materials is also presented.

Methods of Making a Consolidated Material

As summarized above, the subject invention provides a method for producing a purified semiconductor or metallic material. The subject methods are suitable for use with any of a number of semiconductor or metallic materials, for instance, the material may be one or more of silicon (Si), titanium (Ti), zirconium (Zr), vanadium (V), chromium (Cr), manganese (Mn), iron (Fe), cobalt (Co), nickel (Ni), copper (Cu), gallium (Ga), sodium (Na), boron (B), germanium (Ge), GaAs, CdTe, CuInSe$_2$, Cu(InGa)Se$_2$, or the like. In certain embodiments, the material is silicon and in other embodiments the material is titanium. The semiconductor or metallic material may be obtained from any suitable source, for instance, from large silicon or metal producing companies.

Figure 3:
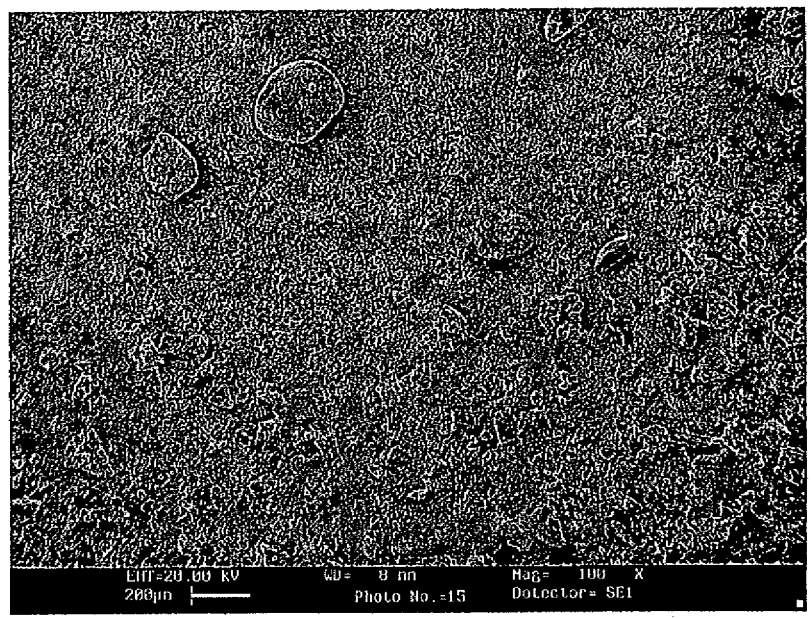
FIGS. 3-5 illustrate size of Silicon particle fines to be consolidated in accordance with the methods of the invention.
Figure 4:
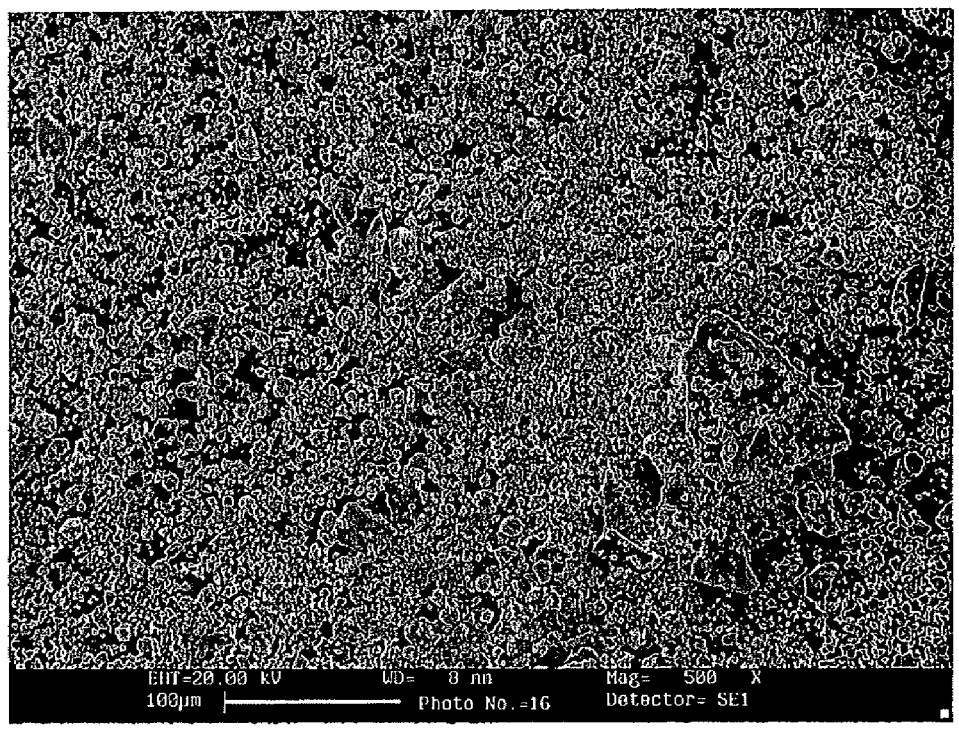
Figure 5:
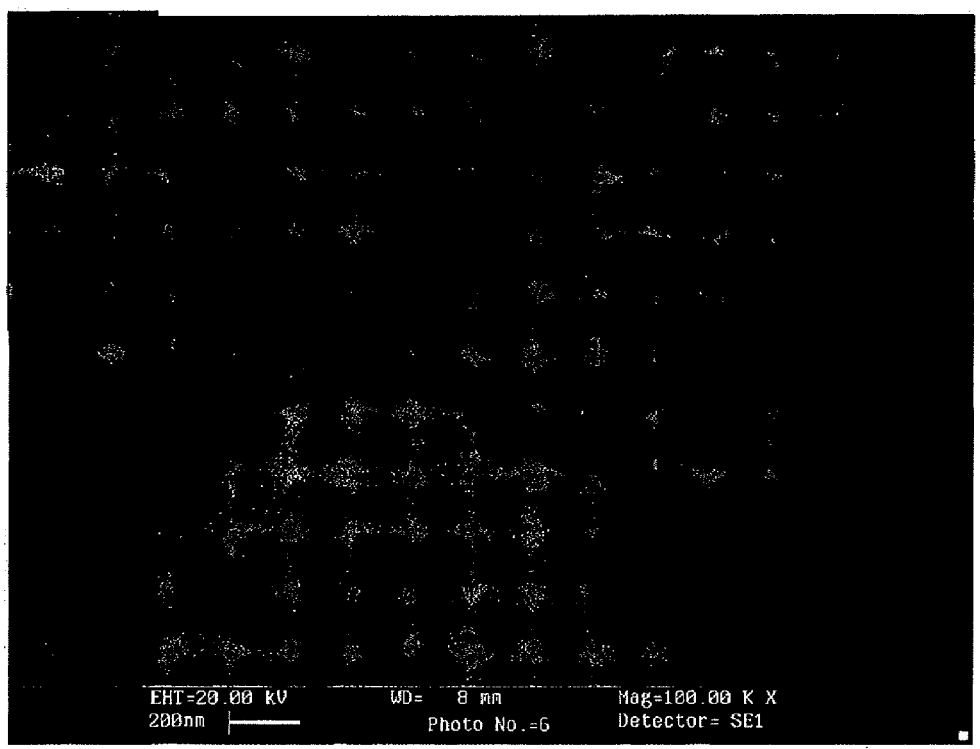

The semiconductor or metallic material to be purified and/or consolidated is typically in solid form, such as in a fine particle powder. The powder may have any suitable size for use in a consolidation reaction. In certain embodiments, the powder may have an average particle diameter of less than one micron, for instance, the average particle diameter may be about 100 nm or smaller, such as about 50 nm, or about 25 nm or about 10 nm or smaller. In certain embodiments, the average particle diameter may have a substantially larger range, for instance, from about 1 μm to 1 mm or 1000 μm, including about 10 μm to about 500 μm, including about 15 μm to about 250 μm, such as about 20 μm to about 100 μm, for instance, 25 μm to about 75 μm. In certain embodiments, the average particle diameter may be from about 0.5 μm to about 50 μm, such as 10-20 μm balls. The size distribution, in certain embodiments, can be unimodal, bimodal or multimodal and may range between 1 nm to about 1 mm or larger, for instance, about 10 nm to 0.5 mm, including about 100 nm to about 250 nm, and 0-100% of cumulative frequency distribution. In certain embodiments, the surface area of the particles may be from about 250 m^2/g to about 0.0025 m^2/g, including about 5 m^2/g to 0.05 M^2/g. See for instance, FIGS. 3-5, which illustrate various particle sizes of Silicon fines that may be consolidated in accordance with the methods of the subject invention.

In certain instances, the powder is porous, having a relatively large surface-to-volume ratio as compared to the purified, consolidated material. For instance, the surface area may be higher than 10 m$^2$/gram or even higher than 100 m$^2$/gram. The apparent density may range from about 0.1 gram per cubic centimeter (cc) to about 1 gram per cc or more, including about 0.2 grams per cc to about 0.5 grams per cc. The apparent density ratio of the final product may range from about 1 gram per cc to about 2.2 grams per cc. Hence, in accordance with the methods of the invention, there may be a 100%, specifically, a 1000% (e.g., a 10-fold increase) in the density of the purified and/or consolidated material end product.

The initial semiconductor or metallic material does not need to be processed before hand. However, if the material (e.g., silicon or metal powder) has an abundant amount of surface oxidation (for instance, greater than about 1.0%, greater than about 2.0% oxygen content) then the powder may be pre-etched with an etching fluid (e.g., HF, HNO$_3$, H$_2$O$_2$) so as to remove the excessive oxygen content prior to processing. For instance, in certain embodiments, a material to be consolidated may have a surface oxygen content: 20 ppmw to 1000 ppmw for consolidation without acid etching, or above 1000 ppmw pre-acid-etching. In certain embodiments, the amount of the metal oxide present on the semiconductor or metal layer ranges from about 0.1 to about 10%.

In certain embodiments, said etching may be from about 1 to about 60 minutes, including about 10 to about 40 minutes, such as 30 minutes.

In accordance with the methods of the invention, a semiconductor or metallic material to be purified and/or consolidated is contacted with a halide. The semiconductor or metallic material may be contacted with the halide in any suitable manner so long as the manner employed allows for the admixture of the two materials and facilitates the eventual consolidation of the semiconductor or metallic material into a consolidated end product. In certain embodiments, the consolidated end product contains a lower surface-to-volume ratio (e.g., a greater density) than the analogous semiconductor or metallic material that has not been consolidated in accordance with the methods of the invention. For instance, in certain embodiments the semiconductor or metallic material is contacted with the halide in a manner sufficient to at least initially form an admixture of the two components. In other embodiments, the semiconductor or metallic material is simply loaded into a suitable reaction vessel (e.g., container) and the halide is also loaded into the reaction vessel. Once loaded the reactants may be mixed or not.

The semiconductor or metallic material may be contacted with the halide in any logical order. For instance, the semiconductor or metallic material may be contacted with the halide prior to or after being contacted with a suitable reaction container. In certain embodiments, the semiconductor or metallic material is contacted with the halide by placing the individual materials into a mixing container and then mixing the two materials, for instance, via a mixer, a vibratory device, hand shaking the container, or the like. The semiconductor or metallic material may or may not include a dopant and may or may not be oxidized.

Any suitable halide may be used. For instance, the halide may be a one or more of fluoride, chloride, bromide, iodide, astatide, or the like. In certain embodiments, the halide may be a metal halide. For instance, in certain embodiments, the metal halide may be sodium chloride (NaCl), halides of the group IA or IIA, potassium chloride (KCl), calcium chloride ($CaCl_2$), barium chloride ($BaCl_2$), magnesium chloride ($MgCl_2$), sodium fluoride (NaF), potassium fluoride (KF), calcium fluoride ($CaF_2$), barium fluoride ($BaF_2$), magnesium fluoride ($MgBr_2$), sodium bromide (NaBr), potassium bromide (KBr), calcium bromide ($CaBr_2$), barium bromide ($BaBr_2$), magnesium bromide ($MgBr_2$), sodium iodide (NaI), potassium iodide (KI), calcium iodide ($CaI_2$), barium iodide ($BaI_2$), magnesium iodide ($MgI_2$), and the like. In certain embodiments, the metal halide is NaF and/or $CaF_2$. The halide may be in the form of a powder, bulk material (e.g., as a small or large chunk), as a solution, a slurry, or the like. In certain embodiments, the halide is in the form of a fine powder.

The particles of the halide (e.g., the halide powder) may have any suitable size. In certain embodiments, the halide particles may have an average particle diameter in the sub-microns, for instance, the average particle size diameter may be about 100 nm or smaller, such as about 50 nm, or about 25 nm or smaller. In certain embodiments, the average particle size diameter may be substantially larger, for instance, up to about 1000 μm, including about 0.5 μm to about 500 μm, including about 1 μm to about 250 μm, such as about 25 μm to about 100 μm, or it can be in the mm to cm range of average particle size diameter.

Any suitable amount of semiconductor or metallic material may be contacted and/or admixed with any suitable amount of halide. For instance, a suitable amount (e.g., weight) of semiconductor or metallic material and/or halide may be an amount from about 1 mg to about several tons, including about 100 mg to about 1000 kg, such as about 1 gram to about 100 kg, or about 100 grams or about 125 grams to about 1 kg, including about 200 grams to about 450 or about 500 grams. In certain embodiments, the weight ratio of semiconductor or metallic material to halide is about 0.1:1. In other embodiments the weight ratio of semiconductor or metallic material to halide is greater than 1:1, for instance, about 1:3 or about 1:4 or about 1:6 or about 1:10. Hence, in certain embodiments the amount (e.g., weight) of halide to be contacted with the semiconductor or metallic material is about 3, 6 or 10 or more times the amount of semiconductor or metallic material. For example, in certain embodiments, if 100 g of Si or Ti is to be admixed in a suitable container, than a suitable amount of halide (e.g., NaF or CaF2) may be about 100 g, about 300 g, 600 g, or 1000 g, or more.

A suitable reaction container (container) is any container that is thermally and chemically stable and inert with respect to the semiconductor or metallic material and halide. By "thermally stable" is meant that the container can withstand the high temperatures necessary to melt the semiconductor or metallic material and the halide without melting or breaking down. The container may be made out of any suitable material that is capable of withstanding high temperatures, for instance, heat in excess of about 1000° C., in excess of about 1200° C., in excess of about 1400° C., in excess of about 1450° C., and in certain embodiments in excess of 1500° C., or 1600° C., or 1800° C. By "inert" is meant that the container does not appreciably contribute to a reaction process. Accordingly, the container may be made of or at least include, a temperature resistant inert metal, or other metals such as platinum, nickel, or zirconium. The container may also be made out of, or at least include, graphite, SiC, $Si_2N_4$, BN and similarly stable compounds.

The reaction container can be of any suitable size and of any suitable shape. For instance, in certain embodiments, the container may be a crucible, bottle, bowl, cauldron, chamber, flask, pot, tank, tub, vat, vessel, vial, reaction bed, or any other such containing means. The container may or may not include a lid and/or one or more inlets or outlets. For instance, in certain embodiments, the container is a crucible that includes a lid, which lid may have one or more outlets, vents or holes.

In certain embodiments, the container includes at least once surface (e.g., an interior surface) that is at least coated with graphite. In certain embodiments, the container includes multiple surfaces, for instance, 2, 3, 4, or more surfaces that are at least coated with graphite. In certain embodiments, the graphite coating comprises one or more layers of a graphite linings (e.g., 1, 2, 3, 4, or more). In certain embodiments, the graphite linings are fabricated in such a manner as to form graphite foils so as to line one or more surfaces the container (e.g., the four vertical walls of the container). In certain embodiments, the bottom of the container may also be coated with one or more graphite linings. For instance, in certain embodiments, one or more (e.g., 2, 3, 4, 5, or more) graphite foil discs may be added to the bottom of the container prior to loading the admixture into the reaction container. In certain embodiments, the container is made of graphite, which container may include one or more additional graphite foil linings.

The graphite linings (e.g., foils and/or discs) may be of any suitable shape and size. In certain embodiments, the foils are cylindrical in shape and about 0.01 inches thick. In certain embodiments, the discs are flat and about 1 to 3 mm thick. The graphite may be of any purity, but is typically dense, high purity graphite. For instance, in certain embodiments, the graphite may have a density of about 1.4 grams per cc, or about 1.7 grams per cc, or about 1.9 grams per cc. Additionally, in certain embodiments, a thin layer, about 1 mm thick, of halide (e.g., BaF) may be added on top of the top layer of the graphite discs.

A unique feature of the subject invention is that in certain embodiments, the container does not appreciably interact with the reaction constituents. For instance, the presence of the one or more graphite discs foils and/or halide bottom coating prevents the container from appreciably reacting with the semiconductor or metallic material or the halide, which may in turn prevent the formation of SiC and the cracking of the container at high temperatures. Additionally, as is described in greater detail below, the halide (e.g., NaF or $CaF_2$) wets the silicon or titanium but does not wet the graphite container. The graphite container can be reused in further purification and/or consolidation processes.

In accordance with the methods of the invention, once the semiconductor or metallic material is contacted with the halide and admixed, a semiconductor/metallic material-halide admixture is produced. The resultant admixture may then be heated, for instance, within a suitable reaction container (e.g., a crucible). The heating of the container and/or the admixture may take place by any suitable means such as those well known in the art. For instance, any mechanism for transferring thermal energy or heat to the container and/or the admixture may be employed. Specifically, the container and/or the admixture therein may be heated by applying radiofrequency (RF) energy to the container and/or the admixture, or the container may be heated via resistance heating, or arc or infrared heating. Accordingly, the container and/or admixture may be heated within a chamber of a suitable RF induction furnace or resistance heated graphite furnace, or the like.

The heating of the container and/or the admixture may be performed in any suitable manner, for any suitable time period and any amount of thermal energy or heat may be applied, so as to cause the melting of the halide and/or the semiconductor or metallic material and without causing a substantial generation of carbon build up (e.g. SiC or TiC) in the element to be consolidated. Accordingly, the thermal energy or heat applied should be above both the melting point of the halide and/or above the melting point of the semiconductor or metallic material, but below that at which a substantial evaporation of the halide or element occurs. The heating may be done at atmospheric pressure, slightly above atmospheric pressure or below atmospheric pressure (e.g., by the application of a vacuum during the heating process). In certain embodiments, the heating is done at atmospheric pressure (e.g., 1 atm). In certain embodiments, the heating is done in slightly above atmospheric pressure, for instance, by flowing an inert gas (e.g., argon) through the reactor during the heating process.

Suitable temperature ranges to which the semiconductor or metallic materials may be heated may vary from about 300° C. to about 2000° C., including about 1100° C. to about 1640° C., for instance about 1300° C. to about 1500° C., such as about 1400° C. to about 1450° C., dependent on the melting point of the semiconductor or metallic materials, the melting point of the halides, the reactor used, the reaction conditions and reaction vessel (container) employed. For example, where the semiconductor or metallic material is Si, a suitable amount of thermal energy or heat to be applied is such to heat the admixture to above about 1420° C., the melting point of Si. Where the semiconductor or metallic material is Ti, a suitable amount of thermal energy or heat to be applied to heat the admixture is about 1640° C. The time period of such heat application may vary but should be a long enough period so as to allow the semiconductor or metallic material and halide to melt and become molten. In certain embodiments, the time period and amount of thermal energy applied is long and high enough to entirely melt the semiconductor or metallic material and the halide. In certain embodiments, thermal energy or heat is applied to the container and/or the admixture at such a temperature and in such a manner that the semiconductor or metallic material melts and forms a pool, for instance, a pool of molten semiconductor or metallic material within a pool of molten halide. For instance, in certain embodiments, the molten semiconductor or metallic material coalesces into a pool on top of which the halide (e.g., metal halide) segregates.

Thermal energy or heat may be applied in accordance with any suitable protocol for a sufficient time period so as to cause the particulate matter of the semiconductor or metallic material to become molten and consolidate. In certain embodiments, the container and/or admixture may be heated for a total time period that ranges from several minutes to several hours, which time period may include several different ramping and/or dwelling periods. Specifically, the time period should be long enough to allow the complete melting of both the halide and the semiconductor or metallic material, but not so long that a substantial amount of halide is volatilized and is burned away, or so long that a substantial amount of carbon (e.g., SiC or TiC) is formed.

The container and/or the admixture may be heated in one long continual process or the heating may take place through one or more steps, which steps may or may not involve one or more transitional period(s) of stasis (dwelling) or even cooling. In certain embodiments, the heating takes place in two, three, four or more steps. For instance, in one step, thermal energy or heat may be applied to the container and/or the admixture to a point just before, at, or above the melting point of the halide. An intermediate dwelling step may then take place wherein the temperature is neither appreciably lowered nor raised. In certain embodiments, a suitable dwell period may be from less than about 1 minute to about several hours, including about 5 minutes to about 5 hours, such as 10 minutes to 2 hours, for instance, about 15 minutes to 1 hour, or about 30 minutes to about 45 minutes. Subsequent to the dwell period, heat may again be applied so as to raise the temperature to a point just before, at, or above the melting point of the semiconductor or metallic material. A further intermediate dwelling step may then take place wherein the temperature is neither appreciably lowered nor raised. A suitable second dwell period may be from about 1 min to about 4 hours, including about 1 hour to about 2 hours, depending on the system and size of container. Other steps or sub-steps may also be included (e.g., including temperature set points before, at or after the melting points of the various constituents). In other embodiments, the application of thermal energy or heat takes place in one prolonged, gradual or rapid process.

In certain embodiments, a suitable rate of heating (e.g. a ramping rate) may be as slow as about 0.1° C. per minute or about 0.01° C. per minute, or as rapidly as about 1000° C. per second to 2000° C. per second, for instance, a heating rate in a range from about 0.5° C. per minute to about 1000° C. per minute, including about 1° C. per minute to about 500° C. per minute, such as 2° C. per minute to about 100° C. per minute, or about 10° C. per minute to about 50° C. per minute, including about 20° C. per minute.

Thermal energy or heat may be applied to the admixture rapidly or over one or more prolonged ramping periods. For instance, the temperature may be ramped to a desired set point (e.g., above the melting point of the semiconductor or metallic material—Si, between about 1410-1420° C.) over a single prolonged time period of about 15 minutes, about minutes 30, about 45 minutes, about 1 hour, about 2 hours, or more. Alternatively, the temperature may be ramped to multiple set points at the same or different rates of thermal increase. For instance, the temperature may be ramped to one set point (e.g., above the melting point of the halide—NaF, 1100° C.) at one rate (e.g., 15° C./min), then ramped to a second set point (e.g., just below the melting point of the semiconductor or metallic material—1390° C.) at a different rate (e.g., 10° C./min), and then ramped to a third set point (e.g., above the melting point of the semiconductor or metallic material—1450° C.) at a third rate (e.g., 2° C./min). One or more dwell periods may also be included. For instance, at the attainment of each set point a dwell period from about 1 second or about 1 minute to about 1 or more hours may be included in the temperature ramping protocol. Precise temperature set points and rates of thermal increase may vary dependent on the semiconductor or metallic materials, halides, reactors, etc. employed and may readily be determined by one of skill in the art.

In accordance with the methods of the invention, in certain embodiments, thermal energy or heat is applied to the container and/or the admixture in such a manner that the halide melts prior to the substantial melting of the semiconductor or metallic material. In certain embodiments, the melted (e.g., molten) halide disperses into one or more pores of the semiconductor or metallic material thereby at least partially filling and/or coating the semiconductor or metallic material. Accordingly, in certain embodiments, an intermediate product of the subject invention is a partially or fully encapsulated semiconductor or metallic material, the particles of which is partially or fully encapsulated by the halide (e.g., a metallic halide).

Although any suitable semiconductor or metallic material or any suitable halide may be used, in certain embodiments, the selection of the semiconductor or metallic material determines the type of halide that may be used. Specifically, in certain embodiments, the halide to be admixed should be selected such that it has a melting point below that of the semiconductor or metallic material sought to be consolidated and admixed with the halide (e.g., the halide should melt before the semiconductor or metallic material). Additionally, the halide should be such that it does not evidence a substantial amount of reaction with the element or volatilization at the melting point of the semiconductor or metallic material, given the other various conditions being employed. Specifically, in certain embodiments, the halide should be such that once it melts it wets and it encapsulates the semiconductor or metallic material and forms a fluid (e.g., liquid) top-layer covering the semiconductor or metallic material once the semiconductor or metallic material melts and does not entirely volatilize at or around the melting point of the semiconductor or metallic material.

Accordingly, in certain embodiments, the halide to be admixed may be selected such that upon melting it does not substantially volatilize and dissolve away, but rather the molten halide etches oxide from the surface of the semiconductor or metallic material particles, thereby cleaning the semiconductor or metallic material particles. Further, in certain embodiments, the halide adheres to the semiconductor or metallic material particles thereby protecting them from other contaminants (e.g., from the container, oxidation, etc.) and may also act as a purification sink, wherein impurities may be absorbed and sequestered away from the semiconductor or metallic material. Further still, in certain embodiments, the halide acts to increase the heat transferability of the semiconductor or metallic material powder. For example, as the semiconductor or metallic material powder is porous and the halide melts before the semiconductor or metallic material, the halide may travel into and partially fill the pours of the semiconductor or metallic material. This may increase the heat transfer into the semiconductor or metallic material, thereby increasing the overall heat conductivity and facilitating the heating up process. Accordingly, in certain embodiments, an intermediary product of the methods of the subject invention may be a semiconductor or metallic material that has been coated and/or etched and/or cleaned and/or saturated with molten halide.

For example, where the semiconductor or metallic material is Si, which has a melting point of about 1410° C., the halide selected to be admixed with Si may have a melting point below 1410° C. In this instance, NaF or $BaF_2$, which have melting points about 1000° C. and 1340° C. (respectively), would be suitable halides to be admixed with the Si; while $CaF_2$, which has a melting point about 1440° C., would be less suitable. However, it is noted that if the semiconductor or metallic material were Ti, which has a melting point of about 1640° C., any of NaF, $BaF_2$, or $CaF_2$ would be suitable to be admixed with the Ti. Additionally, mixtures of fluorides or fluorides with other halides can be used. The impurity content of NaF or any mixture is preferable <1 ppm for any other element and preferably less than 0.1 ppm and most preferably less than 0.01 ppm.

Furthermore, dopant precursors such as $BF_3$ or $NaBF_4$ or $NAPF_6$ $PF_5$ can be added to tailor the B or P content on Si. Equally, fluorides or chlorides of metals can be added to the fluoride main melts to produce Ti alloys.

It is to be noted that the application of thermal energy or heat substantially above the melting point of the semiconductor or metallic material for a prolonged period of time should be avoided. By "substantially above" is meant a temperature that results in the excessive formation of carbon (e.g., SiC or TiC) and/or the cracking of the container.

In accordance with the methods of the invention, once the semiconductor or metallic material is admixed and heated to a suitable temperature a molten composition of the semiconductor or metallic material and the halide is produced. In certain embodiments, the molten composition segregates into two layers; a layer that includes the molten semiconductor or metallic material and a layer that includes molten halide. The molten composition may then be cooled.

The molten composition may be cooled by any suitable manner and over any sufficient time period so as to produce a solidified composition that includes a solid substantially pure semiconductor or metallic material on the bottom of a halide layer (e.g., a solidified halide layer). See, for instance, FIG. 1, wherein can be seen a cooled and solidified composition (100) within a reaction vessel (150) of the subject invention. The composition includes two layers, a solidified and consolidated Silicon layer (110) and a solidified halide (NaF) layer (120). As can be seen, the solidified Silicon layer (110) comprises the bottom layer and the solidified halide layer (120) comprises the top layer.

The composition may be cooled from its molten temperature to about room temperature or below room temperature by flowing a gas, for instance, an inert gas (e.g., argon) or air over the molten materials, or by simply ramping down the thermal regulator (e.g., thermostat) of the reactor, or by quenching, or by air cooling. The composition may cooled rapidly or slowly. In certain embodiments, a suitable solidification rate may be as slow as about 2 cm per hour rapidly as about 100 cm per hour. In other words, the cooling rate may be about 0.1° C. per minute or about 0.01° C. per minute, or as rapidly as about 1000° C. per second to 2000° C. per second, for instance, a suitable cooling rate may range from about 0.5° C. per minute to about 1000° C. per minute, including about 1° C. per minute to about 500° C. per minute, such as 2° C. per minute to about 100° C. per minute, or about 10° C. per minute to about 50° C. per minute, including about 20° C. per minute. It is to be noted that in certain embodiments the rate of cooling may be the same as the rate of heating. In certain embodiments, the cooling is performed in a manner sufficient to cause the unidirectional solidification of the composition.

Specifically, the rate of cooling is such that the cooling of the materials is slower than the rate of diffusion of impurities from the solidification front. Hence, the cooling is performed such that solidification occurs from the bottom of the composition (e.g., the semiconductor or metallic material layer cools and solidifies first) and proceeds on toward the to the top. Accordingly, in certain embodiments, the cooling is performed such that as the solid forms, the semiconductor or metallic material becomes solid first and any impurities therein diffuse into the liquid halide phase and away from the solid/liquid phase interface front. Hence, a substantial amount (if not all) of any impurities are caught up in the halide layer and are thereby sequestered in the halide layer as it is solidified. In this manner, an ingot with large purified grains and/or crystals may be produced or a large, flat wafer or ribbon may be generated. Conversely, a dopant or alloying halide precursor can be added to the halide main phase on purpose, a partial reaction and redistribution will take place and result in a doped Si, or an alloy of Ti. For instance, adding ppm levels of $BF_3$ or $PF_5$ to NaF will result in P type or N type silicon. Adding $FeF_2$ to $CaF_2$ in the presence of Ti will result in a Ti (Fe) alloy.

Once cooled the halide layer can be separated form the semiconductor or metallic material by any means well known in the art so as to effect the substantial, if not total, separation and/or removal of the halide layer from the semiconductor or metallic material layer. For instance, the halide layer can be separated form the semiconductor or metallic material by physically separating the layers and/or by chemically separating the layers. For example, the halide can be drained as a liquid or the solidified layer can be separated from the semiconductor or metallic material by physically separating the layers and/or by chemically separating the layers. Additionally, the two layers can be physically separated by breaking off the top solidified halide (e.g., salt) layer which is substantially weaker than the bottom semiconductor or metallic material layer. The two layers may also be physically separated by transmitting a blunt force to the top halide layer (e.g., by hitting the layer with a blunt force object, such as a hammer or the like) or the two layers may be separated by liquid discharge, mechanical fracture, and/or sandblasting, and the like. Additionally, the two layers may be chemically separated by dissolving the top layer in a suitable solvent (e.g., water) and leaching the top halide layer away (e.g., dissolving the halide layer, NaF, in water or other aqueous solution or other suitable solvent or dissolvent and rinsing it away).

Once separated, a solidified, substantially pure, consolidated semiconductor or metallic material is produced. By substantially pure it is meant a purity in the range of about 99% to about 99.9999%. The consolidated semiconductor or metallic material may include one or more crystals and may be of any suitable shape or fabricated into any suitable shape, such as one or more substantially pure ingots, ribbons, tapes, wafers, or the like. Further, one or more outside layers of the consolidated semiconductor or metallic material may be removed, for instance, prior to further processing.

Figure 2:
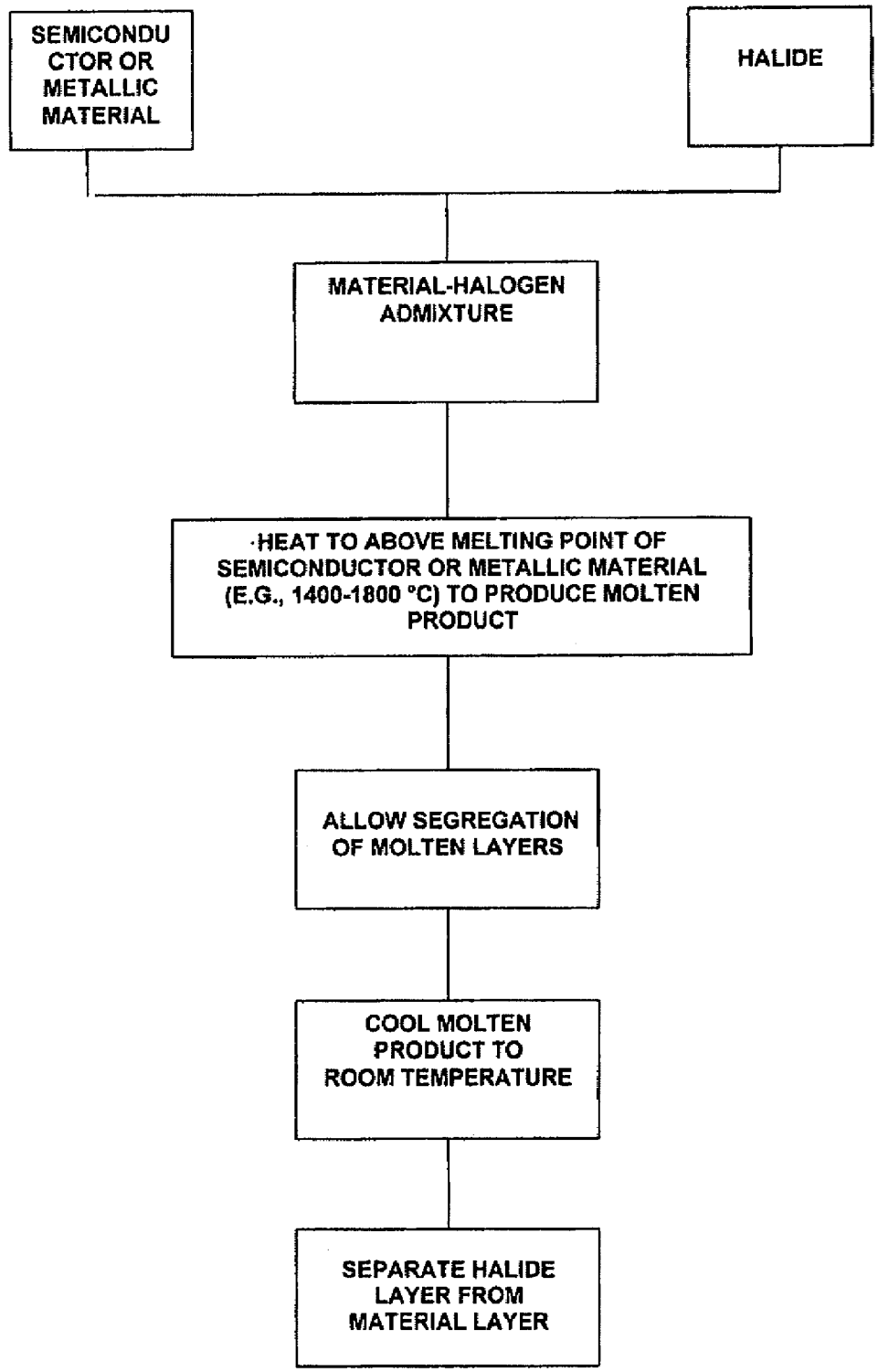
FIG. 2 illustrates a crucible containing a semiconductor or metallic material and halide, in accordance with the invention.

Accordingly, in view of the above, and with reference to FIG. 2, in certain embodiments, the methods of the subject invention, provide for the production of a purified semiconductor or metallic material. In a first step, the method includes admixing a particulate composition of a material with a halide to produce a material-metal halide admixture. The admixture is then heated to a temperature above the material's melting point to produce a molten product and the molten product is allowed to segregate into a lower layer of the material and an upper layer of the halide. The molten product is cooled and then the metal halide is separated from the material, whereby a purified metallic or semiconductor material is produced. It is to be noted that although with respect to the preceding description it appears that the segregation and cooling occur as individual steps, it is understood that said segregation and cooling may take place substantially simultaneously so as to be indistinguishable as two independent steps, or said segregation may occur as two separate and distinguishable events, or as one intermixed event wherein both segregation and cooling occur together.

The consolidated semiconductor or metallic material may be further processed by any of a wide variety of processing methods well known in the art. For instance, the semiconductor or metallic material may be further processed by being reheated in a suitable reactor (as described above) and re-cooled (according to the above parameters), one or more times, so as to re-melt and re-solidify, and thereby further effect unidirectional solidification of the semiconductor or metallic material, thus, further purifying the semiconductor or metallic material. Additionally, the semiconductor or metallic material may be further processed by being subjected to crystal growth in a suitable crystal pulling apparatus, in accordance with protocols well known in the art. Further, the semiconductor or metallic material may either be directly processed after being consolidated, or further processed after one or more additional processing steps (e.g., unidirectional solidification, crystal growth, polishing, etc.), by being fabricated into one or more useful forms such as wafering, as is well known in the art. The consolidated semiconductor or metallic material may be further processed in these or other manners by itself or in conjunction with one or more other consolidated semiconductor or metallic materials.

Utility

The subject methods and compositions find use in a variety of applications. In accordance with the subject invention, the methods are useful for producing semiconductor or metallic materials that have a wide array of technological uses. For instance, the semiconductor or metallic materials produced in accordance with the methods of the subject invention may be used in silicon chips, e.g., in the production of integrated circuits, and/or as components in solar cells.

As is well known in the art, a solar cell is a two-terminal electronic device which generates direct current across a load when the terminals of the device are connected to the load and the cell is illuminated by light of an appropriate wavelength. The solar cell converts a fraction of the incoming light to energy in a form of a current across the load. This energy may be used in a variety of manners well known in the art, for instance, in the production of electricity.

The manufacture of solar cells is well known in the art, the specifics of which need not be reiterated here. But, generally, a solar cell may be manufactured from a flat slab of semiconductor material, for example, a wafer or a portion of a ribbon, or a tape or consolidation of a powder on an appropriate substrate. A solar cell may be made with a variety of semiconductor materials, e.g., silicon, such as that produced by the methods of the subject invention. Specifically, at least a portion of the flat slab is p-type doped. A thin layer near the top of the slab is doped n-type, by diffusion of phosphorus into the slab. In this manner a p-n junction is formed. A p-n junction is a zone of semiconductor doped with a p-type dopant adjacent to a zone of semiconductor doped with an n-type dopant. The silicon ingots and/or wafers may be doped in order to establish a p-n junction and to create suitable contacts. Top contacts are made, for example, in a grid pattern and the bottom side of the slab is covered with a contact, for example, a contact made of aluminum by evaporation and/or electroplating. The terminals of the device are commonly a conductive contact to the p-type zone and a conductive contact to the n-type zone. The conductive contacts are commonly metallic. An anti-reflection coating may be deposited on top of the slab, thereby producing a finished solar cell.

Solar cells may be made by using a single-crystal or polycrystalline silicon wafers, which may be sawed from silicon ingots, such as those produced in accordance with the methods of the subject invention. Solar cells may also be made from polycrystalline silicon "ribbons," produced in accordance with the methods of the invention, in a manner to be more economical than sawing wafers. Solar cells may further be made by the deposition of consolidated silicon on a suitable substrate to generate "thin film" solar cells. In a similar manner, GaAs devices can be processes in molten salts such as fluorides; CdTe and Cu(InxGa1-x)Se2 devices can be processed in halides such as CdCl2.

Because the silicon to be used in the production of the solar cell has been consolidated in accordance with the methods of the invention, the silicon used for making the active regions of solar cells is very pure. If the silicon used is polycrystalline, the crystalline domains may be large, with average domain diameters at least about 50 μm, at least about 100 μm, at least about 150 μm, at least about 200 μm, or at least about 250 μm.

Solar cells produced in accordance with the methods of the subject invention have a variety of uses, for example, to recharge the batteries of remotely-located electronic devices, which are not connected to the electrical grid. In this application, installing a solar cell system containing solar cells of the invention, may be more cost effective than making an electrical grid connection to a remote location. Solar cells may also be connected through an inverter to the electrical grid, serving as electric power generators.

EXAMPLES

The following examples are put forth so as to provide those skilled in the art with a complete disclosure and description of how to make and use embodiments in accordance with the invention, and are not intended to limit the scope of what the inventors regard as their invention. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Experiments were run in accordance with the methods of the subject invention. Although the reaction parameters differed, the same general protocol was employed. Accordingly, the following is the general protocol that was practiced followed by a table that sets forth the various reaction conditions implemented and the results obtained.

In the following experiments, silicon powder was admixed with NaF powder, from about a 1:2 to about a 1:4 weight ratio, in a plastic bottle (e.g., a NALGENE® bottle). The bottle was sealed with a lid and the contents were shaken vigorously. Once sufficiently intermixed, the admixture was loaded into a graphite crucible.

Prior to loading the graphite crucible was prepared in the following manner. The graphite crucible was lined with a graphite layer in such a manner as to form graphite foils within the crucible. The foils were cylindrical in shape and about 0.01 inches thick. Three layers of foils were attached to the inner surface of the crucible. Further, four graphite foil discs were added to the bottom of the crucible. Additionally, a thin layer, about 1 mm thick, of $BaF_2$ was added on top of the top layer of the graphite discs so as to prevent the silicon from reacting with the bottom graphite layer, thereby reducing the formation of SiC and protecting the crucible from cracking. The prepared crucible was then preheated to about 1600° C. to degas and remove any volatile impurities from the graphite. In certain embodiments, the graphite is of high purity containing less than 10 ppm of impurities and preferably less than 1 ppm of impurities.

Once the admixture was loaded into the crucible, the admixture was packed by hand pressing with a pestle so as to obtain a packed grain density of about 40 to about 50%, which density was found to substantially prevent the formation of air bubbles and to facilitate the transfer of heat. The crucible was filled almost to its top with the packed admixture. On top of the packed admixture a thin layer (about 10 to 20 grams) of pure NaF was added. A lid containing two vents (e.g., holes) was then placed on top of the crucible and the crucible was thereby sealed.

Once sealed, the crucible was placed into the chamber of a suitable furnace. For instance, in the various experiments detailed in the tables below, either an RF induction furnace or a resistance heated graphite furnace was used to apply heat to the crucible and the admixture. Once placed into the selected furnace, a vacuum was slowly applied to evacuate the chamber and prevent any species in the air (e.g., oxygen) from reacting with the admixture components and/or graphite of the crucible. Specifically, the chamber was rough pumped down to about 10 mTorr, back filled with Argon and pumped down again. This was repeated three times. After the $3^{rd}$ time, the chamber was back filled with argon and argon was flowed through the chamber so that the pressure in the chamber was maintained slightly above 1 atmosphere, in order to remove any volatile impurities in the gaseous phase. The process may be run in a vacuum, however, in such conditions the rate of volatilization of NaF may be increased.

Once the reactor was packed and suitably prepared a heating sequence was then initiated. The heating sequence varied but generally proceeded as follows.

For runs in the RF induction reactor, the chamber was ramped to a temperature slightly above the melting point of Si (i.e., 1420° C.) over a period of time (e.g., 43 minutes). The temperature was then maintained at that temperature (e.g., above the melting point of NaF, 1420° C.) for a brief period of time (e.g., 15 mins), and then the chamber was cooled, for instance, by running argon through the chamber of the reactor, over a period that was about ⅙ as long as the ramping up period (e.g., 7.5 minutes). See, for example, Table I, Run 1.

For runs in the resistance heated graphite furnace, the chamber was ramped to a first temperature, above the melting of NaF, at a rate of 15° C./minute and maintained at that first temperature for a brief period of time. The chamber was then ramped to a second temperature, that was either slightly below or slightly above the melting point of Si, at a rate of 10° C./minute, and maintained at the temperature for a brief period of time. The chamber was then ramped to a third temperature that was above the melting point of Si, at a rate of about 2° C./minute, and maintained at that temperature for a brief period of time. The chamber was then cooled at a rate of about 1-20° C./minute. See, for example, Table I, Runs 2-4.

The results of Run 2 are set forth in Table II below. As can be seen with reference to Table II, the levels of various contaminants within the initial silicon powder sought to be consolidated was substantial reduced in the consolidated end product.

TABLE I

| ID# | Run 1 | Run 2 | Run 3 | Run 4 |
|---|---|---|---|---|
| NaF/Si ratio | 2.66 | 3.19 | 3.19 | 2 |
| Si powder amount | 10.22 g | 48.0 g | 49.87 g | 125 g |
| Liner materials | Graphite foil | Graphite foil | Graphite Foil | Graphite Foil |
| Furnace | Graphite Furnace (Heat Source: RF Induction) | Graphite Furnace | Graphite Furnace | Graphite Furnace |
| Heating ramp | Ramp to 1420° C. 43 minutes | 15° C./min to 1100° C. 10° C./min to | 15° C./min to 1100° C. 10° C./min | 15° C./min to 1100° C. 10° C./min |

TABLE I-continued

| ID# | Run 1 | Run 2 | Run 3 | Run 4 |
|---|---|---|---|---|
| | | 1390° C. 2° C./min to 1450° C. | to 1390° C. 2° C./min to 1430° C. | to 1390° C. 2° C./min to 1442° C. |
| T-max set point est actual | 1420° C., 7.5 min. | 1450° C., 15 min. | 1430° C., 10 min. | 1442° C., 5 min. |
| T-max Cooling ramp | 1420° C. | over 1550° C. 10° C./min. | over 1530° C. 10° C./min. | 1436° C. 10° C./min |
| Total weight loss, | 1.2 g 8.03 | 3.1 g NA | 2.5 g 26 g | Good melt −99% minimum |
| Si melt recovered, Si recover yield | 78.50% minimum | NA significant | 52% significant | |
| SiC formation | | | | |

TABLE II

| Sample Element | Si powder prior to consolidation | Si after consolidation (Run 2) |
|---|---|---|
| B | 0.04 | 0.15 |
| C | 37 | 120 |
| O | 280-420 | 74 |
| F | ~15 | <1 |
| Na | 0.53 | <1 |
| Al | 0.37 | <0.01 |
| Si | Matrix | Matrix |
| P | <0.05 | 0.06 |
| S | 0.17 | 0.05 |
| Cl | ~1 | ~0.2 |
| K | <0.1 | <0.1 |
| Ca | 1 | <0.1 |
| Ti | <0.01 | <0.01 |
| V | <0.01 | <0.01 |
| Cr | 0.11 | <0.05 |
| Mn | <0.05 | <0.05 |
| Fe | 1 | <0.05 |
| Co | <0.01 | <0.01 |
| Ni | <0.01 | <0.01 |
| Cu | <0.05 | <0.05 |
| Zr | <0.05 | <0.05 |
| Mo | <0.05 | <0.05 |
| Ag | <0.1 | <0.1 |

All publications and patents cited in this specification are herein incorporated by reference as if each individual publication or patent were specifically and individually indicated to be incorporated by reference.

While the invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the invention. All such modifications are intended to be within the scope of the claims appended hereto.

What is claimed is:

1. A method for producing a purified semiconductor or metallic material, said method comprising:
   (a) admixing a particulate composition of a semiconductor or metallic material with a metal halide to produce a material-metal halide admixture, where the particulate composition has a first density;
   (b) heating the admixture to a temperature above a melting point of the semiconductor or metallic material in a container that is chemically and physically stable at said temperature;
   (c) allowing the admixture to segregate into a molten layer of the semiconductor or metallic material and a molten layer of the metal halide;
   (d) cooling the admixture such that the molten layer of the semiconductor or metallic material and the molten layer of the metal halide both solidify; and
   (e) separating the metal halide from the semiconductor or metallic material subsequent to the cooling, where the purified semiconductor or metallic material is produced having a second density that is greater than the first density.

2. The method according to claim 1, wherein (a) is carried out in a liquid, such that the particulate composition and the metal halide are in a form of a slurry.

3. The method according to claim 1, wherein the particulate composition comprises one or more of: Si, Ti, Zr, V, Cr, Mn, Fe, Co, Ni, Ga, Na, B, Ge, GaAs, CdTe, $CuInSe_2$, or $Cu(InGa)Se_2$.

4. The method according to claim 3, wherein the particulate composition is Si or Ti.

5. The method according to claim 1, wherein the metal halide comprises a member selected from: sodium chloride (NaCl), halides of a group IA, or halides of a group IIA.

6. The method according to claim 5, wherein the halides of group IA or the halides of group IIA comprise at least one of: potassium chloride (KCl), calcium chloride ($CaCl_2$), barium chloride ($BaCl_2$), magnesium chloride ($MgCl_2$), sodium fluoride (NaF), potassium fluoride (KF), calcium fluoride ($CaF_2$), barium fluoride ($BaF_2$), magnesium fluoride ($MgBr_2$), sodium bromide (NaBr), potassium bromide (KBr), calcium bromide ($CaBr_2$), barium bromide ($BaBr_2$), magnesium bromide ($MgBr_2$), sodium iodide (NaI), potassium iodide (KI), calcium iodide ($CaI_2$), barium iodide ($BaI_2$), or magnesium iodide ($MgI_2$).

7. The method according to claim 1, wherein the particulate composition comprises a metal.

8. The method according to claim 1, wherein the particulate composition comprises a powder.

9. The method according to claim 8, wherein the powder comprises metal particles having an average diameter from about 0.01 microns to about 10 mm.

10. The method according to claim 1, wherein an internal surface of the container comprises graphite.

11. The method according to claim 10, wherein said internal surface further comprises a graphite foil.

12. The method according to claim 1, wherein the temperature ranges from about 1000° C. to about 1500° C.

13. The method according to claim 1, wherein b) further comprises:

heating the admixture to a temperature above a melting point of the metal halide prior to heating the admixture to the temperature above the melting point of the semiconductor or metallic material; and applying a dwell period after heating the admixture to the temperature above the melting point of the metal halide but prior to heating the admixture to the temperature above the melting point of the semiconductor or metallic material.

14. The method according to claim 1, further comprising repeating b) and c) one or more times prior to d).

15. The method according to claim 1, wherein the metal halide is physically or chemically separated from the semiconductor or metallic material.

16. The method according to claim 1, wherein the separating results in a substantial removal of the metal halide from the semiconductor or metallic material.

17. The method according to claim 1, wherein the cooling is performed at a cooling rate that ranges from about 1° C./min to about 100° C./min.

18. The method according to claim 1, wherein the purified semiconductor or metallic material comprises: an ingot, a wafer, or a ribbon.

19. The method according to claim 1, wherein the metal halide wets the semiconductor or metallic material without wetting the container.

20. The method according to claim 1, wherein the molten layer of the semiconductor or metallic material solidifies before the molten layer of the metal halide solidifies.

* * * * *